(12) United States Patent
Blizzard

(10) Patent No.: US 9,911,368 B2
(45) Date of Patent: Mar. 6, 2018

(54) TAG HOLDER

(71) Applicant: Thundershirt, LLC, Durham, NC (US)

(72) Inventor: Philip J. Blizzard, Durham, NC (US)

(73) Assignee: THUNDERSHIRT, LLC, Durham, NC (US)

(*) Notice: Subject to any disclaimer, the term of this patent is extended or adjusted under 35 U.S.C. 154(b) by 0 days.

(21) Appl. No.: 15/257,451

(22) Filed: Sep. 6, 2016

(65) Prior Publication Data
US 2017/0069234 A1 Mar. 9, 2017

Related U.S. Application Data

(60) Provisional application No. 62/214,460, filed on Sep. 4, 2015.

(51) Int. Cl.
G09F 3/18 (2006.01)
A01K 11/00 (2006.01)
G09F 3/14 (2006.01)
A01K 27/00 (2006.01)

(52) U.S. Cl.
CPC .............. G09F 3/185 (2013.01); A01K 11/00 (2013.01); A01K 27/001 (2013.01); G09F 3/14 (2013.01)

(58) Field of Classification Search
CPC .............. G09F 3/20; G09F 3/14; A01K 11/00
USPC .......................................................... 40/303
See application file for complete search history.

(56) References Cited

U.S. PATENT DOCUMENTS 1,452,250 A    4/1923  Moore et al.
1,868,563 A *  7/1932  Cicourel ................. E05B 19/24
                                                    40/330
1,966,550 A *  7/1934  Handy .................... E05B 19/24
                                                    250/465.1
D136,753 S    11/1943  Lyon
2,793,451 A    5/1957  Goldsholl
2,964,937 A * 12/1960  Lautin .................. A45C 11/323
                                                    206/37.7
2,982,041 A *  5/1961  Kent ....................... E05B 19/24
                                                    40/330
3,349,589 A * 10/1967  Fricke .................... E05B 19/04
                                                    24/576.1
4,215,497 A    8/1980  Levy
4,259,798 A    4/1981  McConnell
(Continued)

FOREIGN PATENT DOCUMENTS

WO          0120588 A1   3/2001

OTHER PUBLICATIONS

Thundershirt, LLC, European Patent Application No. 16187179.3, Extended European Search Report, dated Jan. 6, 2017.
(Continued)

Primary Examiner — Shin Kim
(74) Attorney, Agent, or Firm — Michael G. Johnston; Moore & Van Allen, PLLC

(57) ABSTRACT

A pet tag holder supports from a pet collar a pet tag having a hole. The pet tag holder comprises a flexible, resilient body including a major front wall, an opposed major rear wall, side edge walls interconnecting the front and rear walls, a top edge wall, and a bottom edge wall. The top and bottom edge walls are continuous with the side edge walls and interconnect the front and rear walls. The body defines a hollow sleeve having an interior cavity adapted for receiving and enclosing at least one pet tag and a slot for inserting the tag into the sleeve.

9 Claims, 23 Drawing Sheets

(56) References Cited

U.S. PATENT DOCUMENTS

| | | | |
|---|---|---|---|
| 4,349,975 A * | 9/1982 | Chubb | E05B 19/24 40/330 |
| 4,403,487 A * | 9/1983 | Marty | E05B 19/24 283/74 |
| 4,616,435 A | 10/1986 | Perfect | |
| 4,739,566 A | 4/1988 | Smith | |
| D322,816 S | 12/1991 | Immerman | |
| D327,507 S | 6/1992 | Wahl | |
| D369,464 S | 5/1996 | Williams et al. | |
| 5,577,403 A * | 11/1996 | Steeley | E05B 19/00 40/323 |
| 5,819,564 A * | 10/1998 | Watanuki | G07C 9/00944 70/278.2 |
| 6,233,987 B1 * | 5/2001 | Ueno | E05B 19/04 70/395 |
| 6,367,426 B1 | 4/2002 | Schaible | |
| 6,543,161 B2 | 4/2003 | Chin | |
| D480,182 S | 9/2003 | McAnally | |
| D490,113 S | 5/2004 | Nykoluk | |
| 6,735,894 B2 | 5/2004 | Crusenberry et al. | |
| 6,928,845 B2 * | 8/2005 | Howard | E05B 19/24 70/395 |
| 7,267,081 B2 | 9/2007 | Steinbacher | |
| D561,411 S | 2/2008 | Pipenur | |
| D586,815 S | 2/2009 | Friedman | |
| 7,626,103 B1 * | 12/2009 | Phillips | G10D 3/163 84/320 |
| 7,877,909 B1 | 2/2011 | Hagen et al. | |
| D634,117 S | 3/2011 | Morrish et al. | |
| D640,866 S | 7/2011 | Schmiemann | |
| 8,312,654 B2 | 11/2012 | Chang et al. | |
| D728,028 S | 4/2015 | Michalscheck | |
| 2003/0033737 A1 | 2/2003 | Bradshaw et al. | |
| 2006/0265917 A1 * | 11/2006 | Wilson | E05B 19/24 40/330 |
| 2007/0130814 A1 | 6/2007 | Block | |
| 2007/0283901 A1 | 12/2007 | Levally | |
| 2010/0242860 A1 | 9/2010 | Chaffin | |
| 2014/0007477 A1 | 1/2014 | Berger et al. | |
| 2014/0283424 A1 | 9/2014 | Cope | |

OTHER PUBLICATIONS

EPO; Office Action for European Application No. 16187179.3 dated Nov. 28, 2017, 6 pages.

* cited by examiner

TAG HOLDER

CROSS-REFERENCES

This application is related to U.S. provisional application No. 62/214,460, filed Sep. 4, 2015, entitled "TAG HOLDER", naming Philip J. Blizzard as the inventor. The contents of the provisional application are incorporated herein by reference in their entirety, and the benefit of the filing date of the provisional application is hereby claimed for all purposes that are legally served by such claim for the benefit of the filing date.

BACKGROUND

A holder for pet tags for attachment to pet collars is described and, more particularly, a pet tag holder for securely accommodating one or more tags while preventing rattling of the tags and provide a means for securely attaching the tags to a pet collar.

Pet tags are commercially constructed in various shapes of rigid materials, such as metal or hard plastic, to provide desired strength and durability. The tags are usually attached to a ring on a pet's collar using an S-shaped hook or a ring. The pet tags invariably rattle whenever the pet moves, and the tags impact hard objects or strike each other producing undesirable, objectionable noise. This is commonly known as rattling or "jingling".

For the foregoing reasons, there is a need for a new pet tag holder for accommodating one or more pet tags from a pet's collar while preventing sound caused by movement and impact of the tags.

SUMMARY

A pet tag holder is described for supporting from a pet collar a pet tag having a hole. The pet tag holder comprises a flexible, resilient body including a major front wall, an opposed major rear wall, side edge walls interconnecting the front and rear walls, a top edge wall, and a bottom edge wall. The top and bottom edge walls are continuous with the side edge walls and interconnect the front and rear walls. The body defines a hollow sleeve having an interior cavity adapted for receiving and enclosing at least one pet tag and a slot for inserting the tag into the sleeve.

A combination of a pet collar having an attaching member and a pet tag holder is also described. The pet tag holder comprises a flexible, resilient body including a major front wall, an opposed major rear wall, side edge walls interconnecting the front and rear walls, a top edge wall, and a bottom edge wall. The top and bottom edge walls are continuous with the side edge walls and interconnect the front and rear walls. The body defines a hollow sleeve having an interior cavity adapted for receiving and enclosing at least one pet tag and a slot for inserting the tag into the sleeve.

In one aspect, the material of the body of the pet tag holder is translucent.

In another aspect, the slot is defined along the bottom edge of the body or in either the front wall or the rear wall adjacent the bottom edge.

In a further aspect, the body defines an opening adapted for connecting the pet tag holder or the pet tag to the collar. The opening may be defined along the top edge of the body for access to the tag at least partially enclosed by the pet tag holder. Alternatively, the opening passes through the front wall and the rear wall of the body and is configured to align with the hole in the at least one pet tag.

In yet another aspect, the pet tag holder is adapted to receive pet tags larger than the slot.

The pet tag holder may further comprise means for attaching to the pet collar.

BRIEF DESCRIPTION OF THE DRAWINGS

For a more complete understanding of the pet tag holder, reference should now be had to the embodiments shown in the accompanying drawings and described below. In the drawings:

FIG. 18 is a photograph of the pet tag fully inserted into the pet tag holder shown in

FIG. 17.

DESCRIPTION

Certain terminology is used herein for convenience only and is not to be taken as a limiting. For example, words such as "upper," "lower," "left," "right," "horizontal," "vertical," "upward," "downward," "top" and "bottom" merely describe the configurations shown in the FIGs. Indeed, the components may be oriented in any direction and the terminology, therefore, should be understood as encompassing such variations unless specified otherwise. The words "interior" and "exterior" refer to directions toward and away from, respectively, the geometric center of the core and designated parts thereof. The terminology includes the words specifically mentioned above, derivatives thereof and words of similar import.

Figure 18:
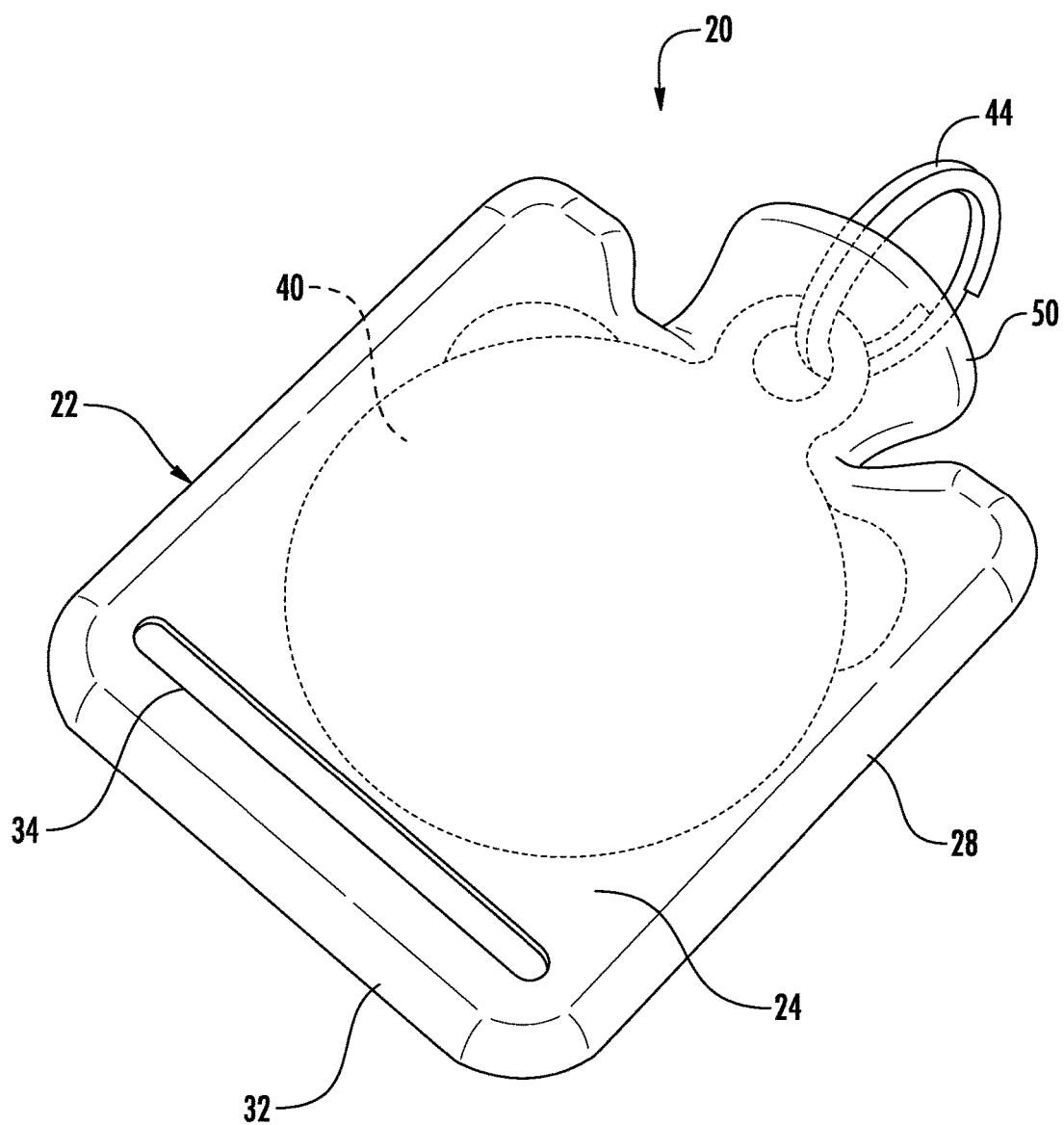
Figure 19:
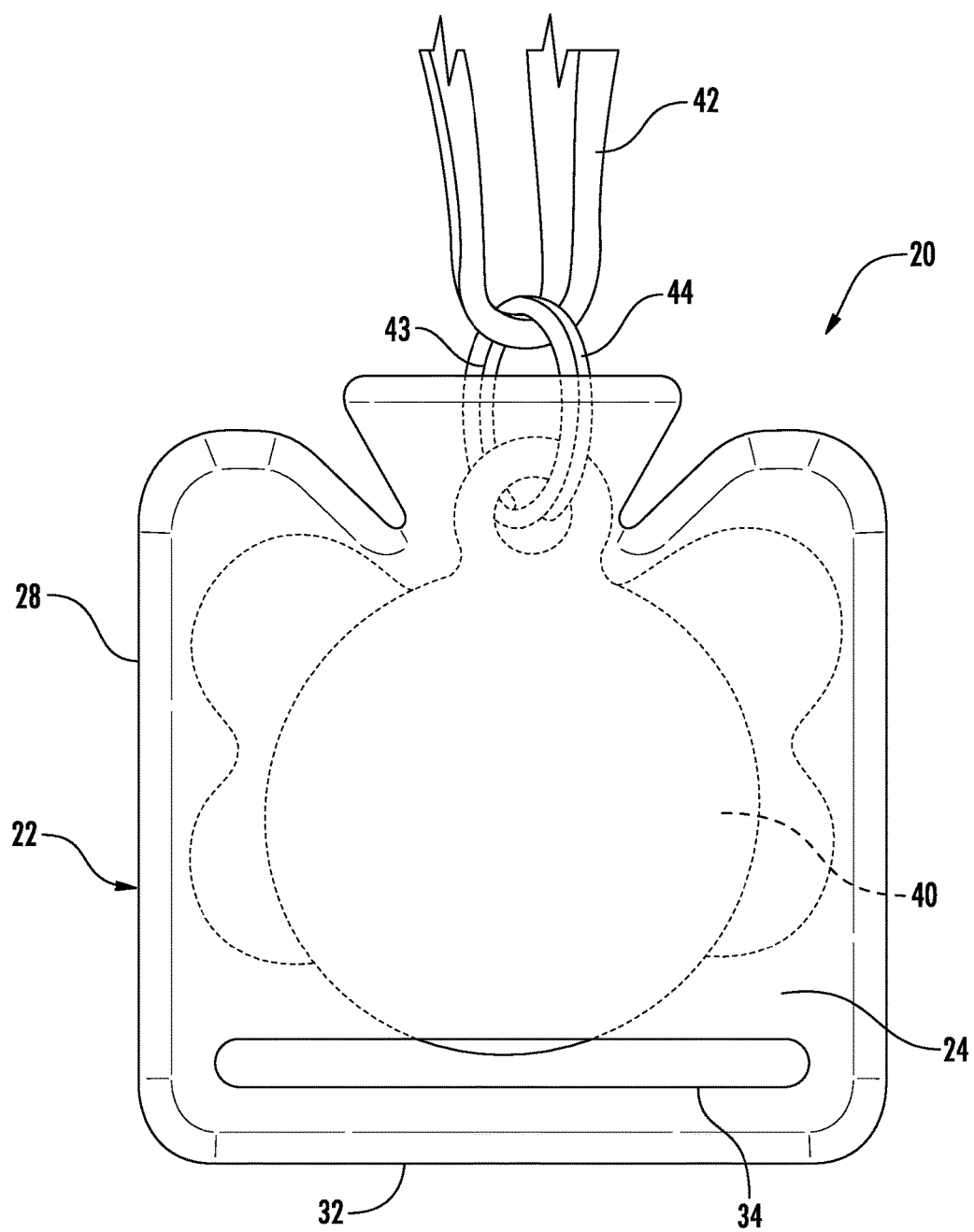
FIG. 19 is a photograph of a pet tag including an s-hook fully inserted into a pet tag holder.

Referring now to the drawings, wherein like reference numerals designate corresponding or similar elements throughout the several views, an embodiment of a pet tag holder is shown in FIGS. 1-8 and generally designated at 20. The tag holder 20 comprises a flexible body 22 including a major front wall 24 and an opposed major rear wall 26. The front and rear walls 24, 26 are interconnected by side edge walls 28, a top edge wall 30 and a bottom edge wall 32 continuous with the side edge walls 28. The body 22 of the tag holder 20 defines a hollow sleeve having an interior cavity 33 for receiving and enclosing one or more pet tags 40. A slot 34 is provided in the body 22 of the tag holder 20 for inserting the tag 40 into the sleeve. An opening 36 is provided centrally along the top edge wall 30. One or more pet tags are inserted into the sleeve through the slot 34 and secured to a pet collar 42 by a securing means, such as a tag fastener 44 secured to the tag 40. As shown in FIGS. 18 and 19, the tag fastener 44 passes through and extends from the opening 36 in the top edge wall 30 of the body 22. The tag holder 20 completely encloses the tags 40 while securing the tags in the holder to prevent rattling.

The pet tag holder 20 may be formed from soft flexible, resilient translucent plastic, rubber or other polymer material. The soft plastic material aids in damping sound which may be generated by contact of the tag holder 20 with other objects. Preferably, the pet tag holder 20 is made of a transparent or semi-transparent material so as to allow an enclosed tag 40 to be read without having to remove the tag 40 from the tag holder 20. The tag holder 20 can be manufactured of molded plastic in a single piece, but also in a specified form which would allow flexibility in critical areas for versatility of adjustments, and semi-rigidness in other areas critical to durability in function of the tag holder 20. Other flexible and durable material which can withstand pet activity may be used, including materials such as leather, durable fabric, or the like may be used. It is understood that the scope of the pet tag holder is not intended to be limited by the materials listed here, but may be carried out using any material which allows the construction and operation of the protective device described herein.

The pet tag holder 20 may also be of any varying shape, width and thickness in order to properly accommodate a given pet tag 40. In the embodiments shown, the tag holder 20 is rectangular in shape. It is understood that the tag holder 20 may take the form of any other shape such as a square, oval, round, and the like.

In one embodiment of the pet tag holder 20, shown in FIGS. 1-8, the slot 34 is formed in the bottom edge wall 32 of the body 22. The slot 34 is substantially the width of the body 22 and allows access for the pet tags 40. The slot 34 allows a pet tag 40 to be disposed within the sleeve formed by the body 22. The flexibility and resilience of the material of the body 22 closes and seals the slot following insertion. Referring to FIGS. 9-16, in another embodiment of the pet tag holder 20 the slot 34 is formed through the front wall 24 of the body 22 adjacent the bottom edge wall 32 for receiving a pet tag 40. The slot 34 is configured to allow a pet tag 40 to be easily disposed within the enclosed sleeve. Although in both embodiments the slot 34 is shown as linear, the slot 34 may be any of several shapes which allow a tag 40 to be securely disposed within the sleeve. In one embodiment, the slot 34 is configured to minimize the likelihood of the tag 40 being separated from the tag holder 20. For example, the width of the slot 34 may be less than the width of the body 22.

A funnel-shaped protrusion 50 is molded along the top edge wall 30 of the body 22 of the pet tag holder 20 and is shown extending outwardly from the top edge wall 30. The central opening 36 in the top edge wall 30 of the tag holder 20 is provided through the protrusion 50 for passing one or more tag fasteners 44 for connection to a pet collar 42. The opening 36 accommodates a fastener 44 on the end of the tag 40, including an s-hook or metal split ring, although other styles of pet tag fasteners 44 may also be used. The opening 36 is defined in order to allow the pet tag holder 20 to hang from the pet collar 42. Passing the tag fastener 44 through the pet tag holder 20 reduces the risk of the tag holder becoming separated from the pet tag. It is understood that the resilience and flexibility of the material of the tag holder 20 allows fasteners 44 of different types and sizes to pass through the sleeve and the opening 36.

Figure 1:
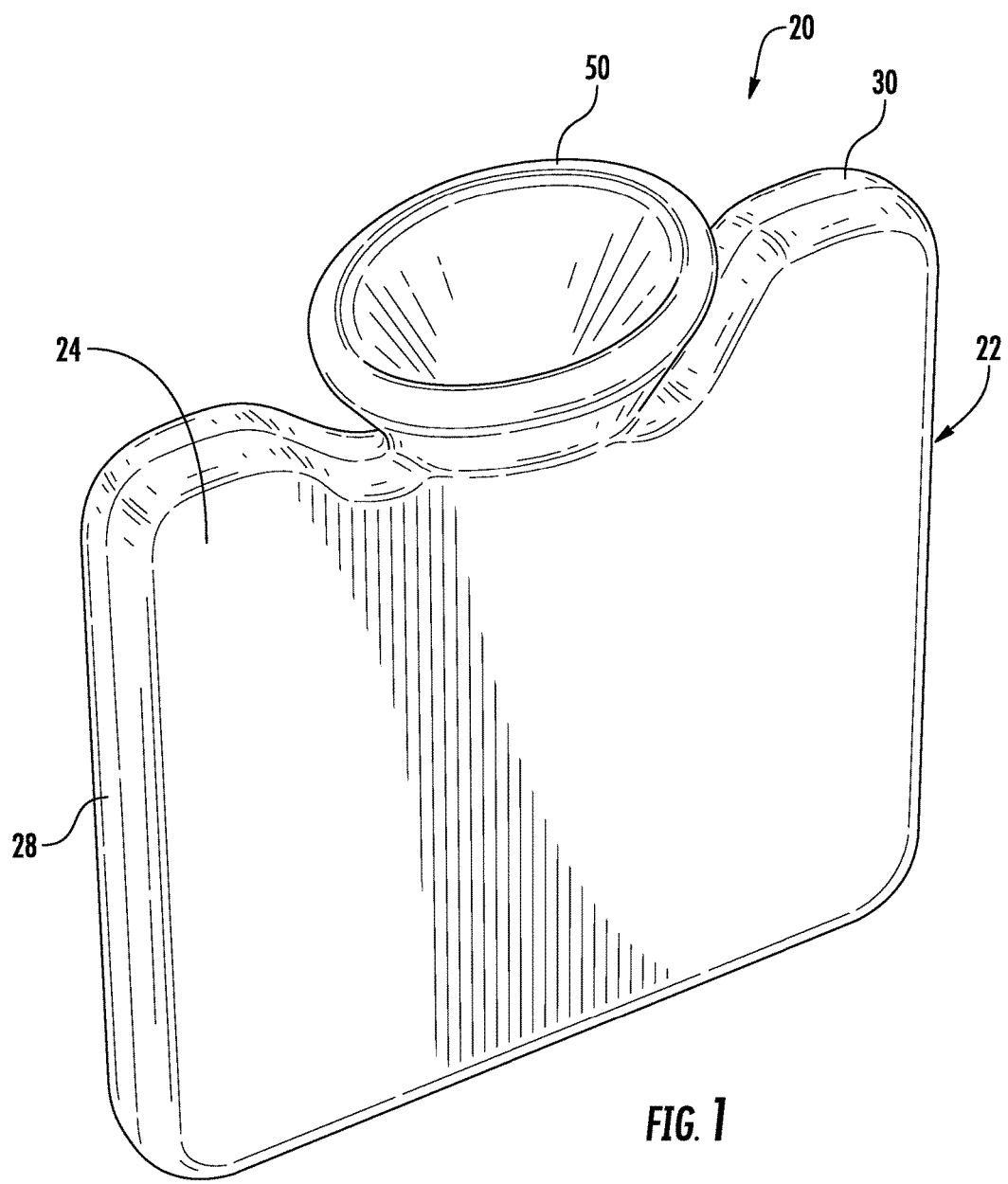
FIG. 1 is a top perspective view of an embodiment of a pet tag holder.
Figure 2:
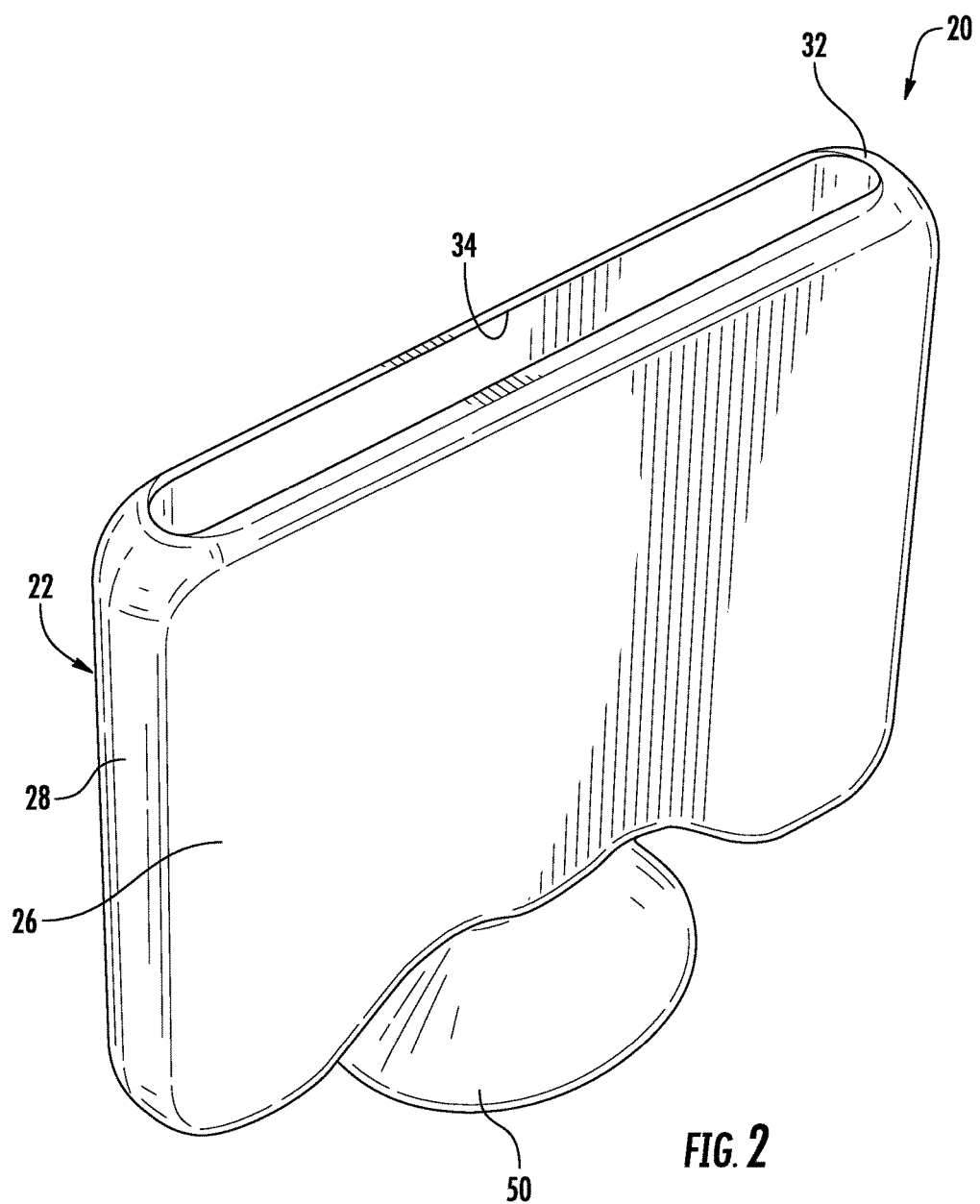
FIG. 2 is a bottom perspective view of the pet tag holder as shown in FIG. 1.
Figure 3:
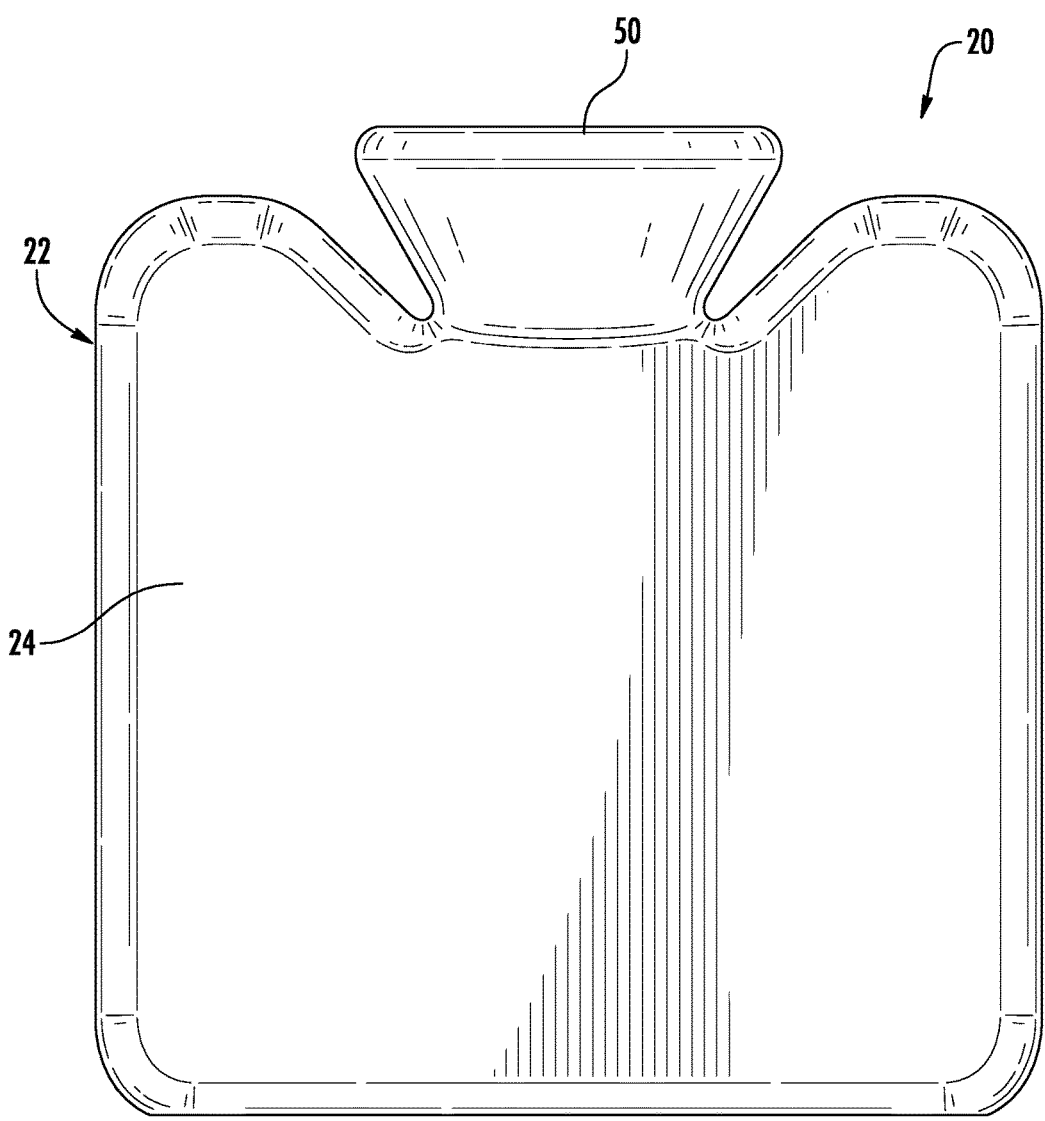
FIG. 3 is a front elevation view of the pet tag holder as shown in FIG. 1.
Figure 4:
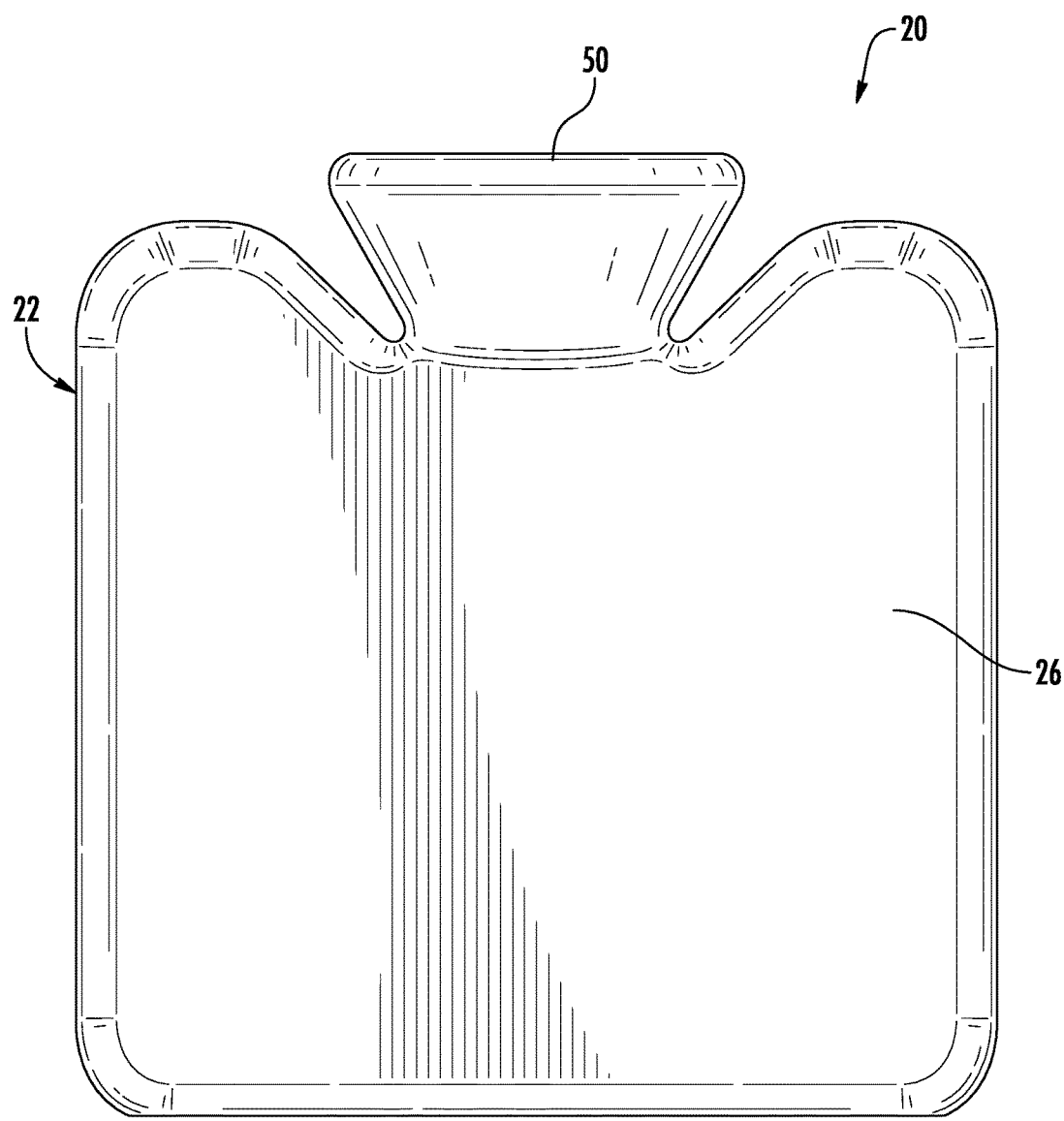
FIG. 4 is a rear elevation view of the pet tag holder as shown in FIG. 1.
Figure 5:
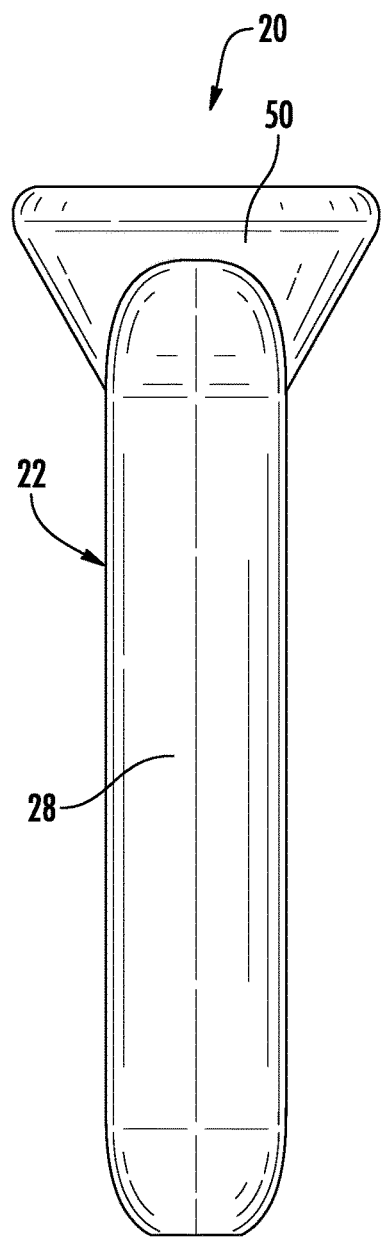
FIG. 5 is a right side elevation view of the pet tag holder as shown in FIG. 1.
Figure 6:
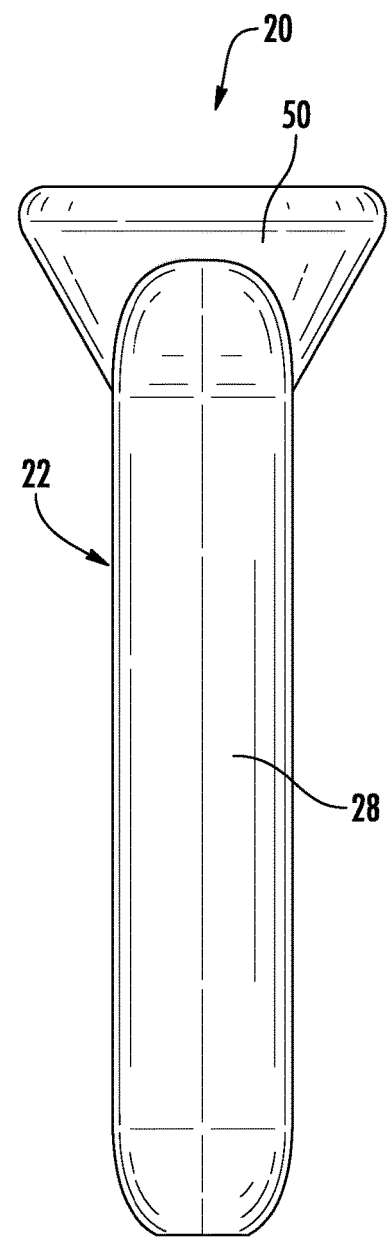
FIG. 6 is a left side view of the pet tag holder as shown in FIG. 1.
Figure 7:
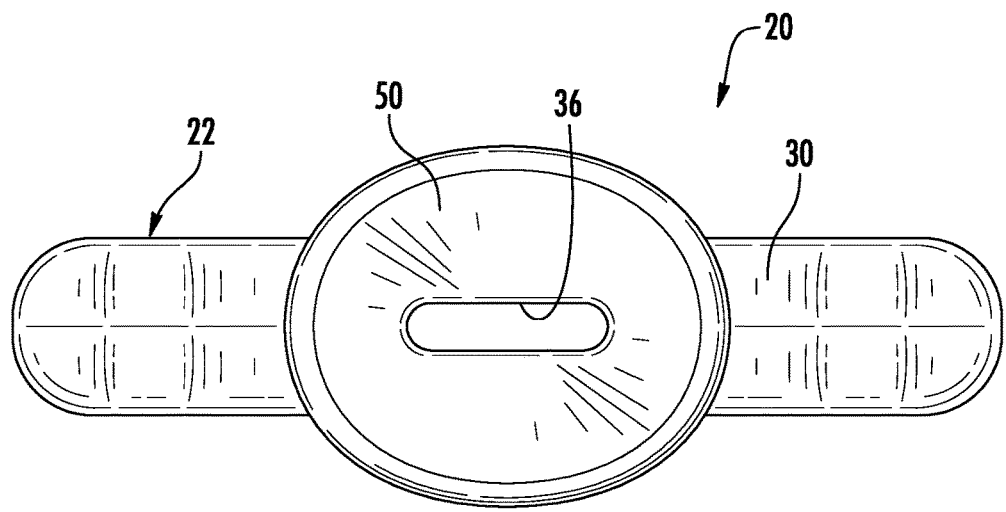
FIG. 7 is a top plan view of the pet tag holder as shown in FIG. 1.
Figure 8:
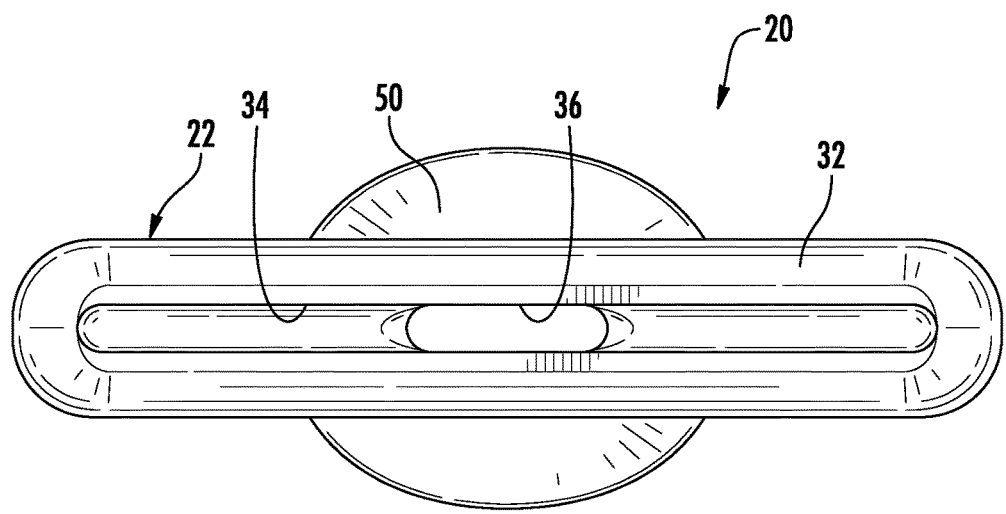
FIG. 8 is a bottom plan view of the pet tag holder as shown in FIG. 1.
Figure 9:
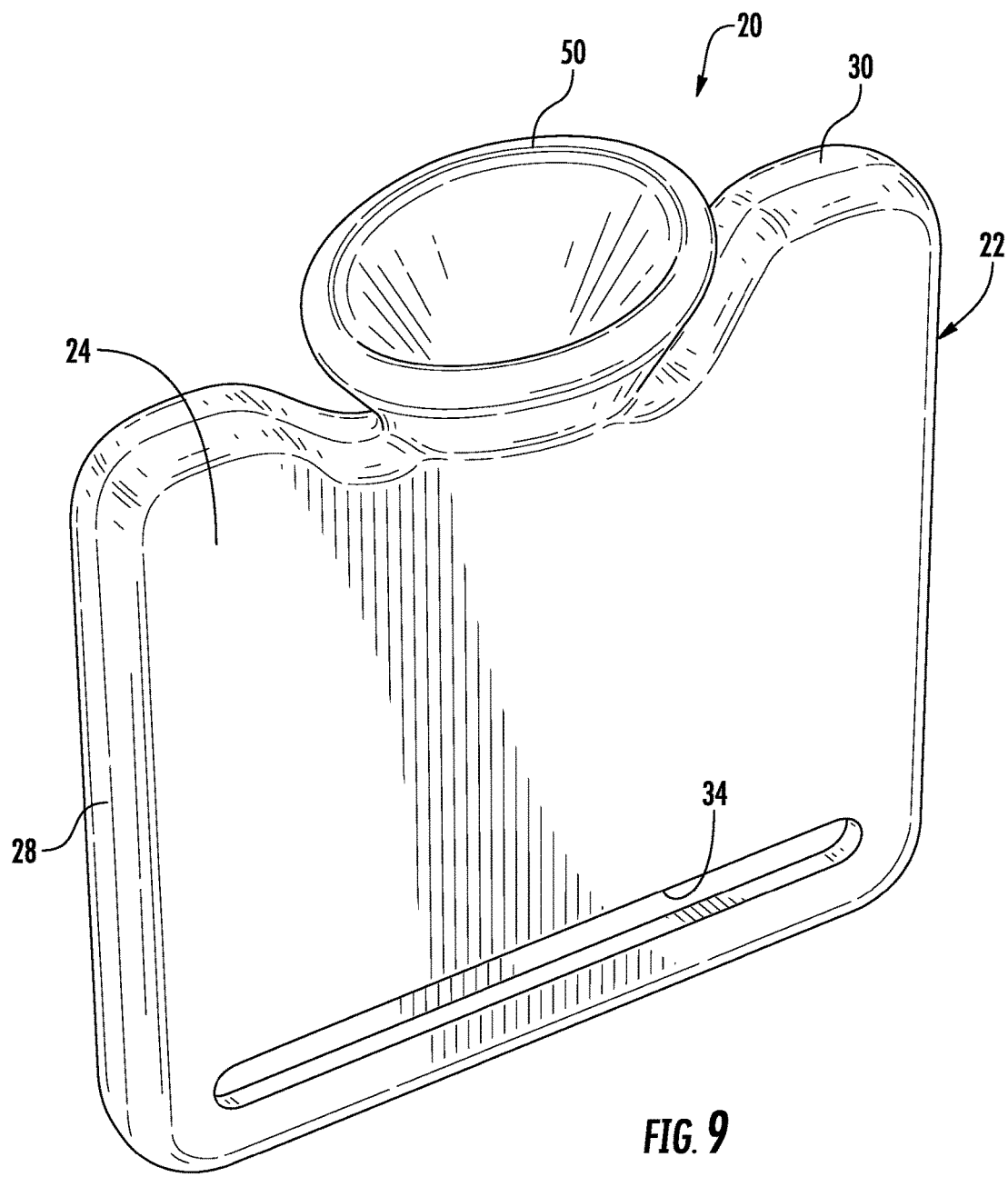
FIG. 9 is a top perspective view of another embodiment of a pet tag holder.
Figure 10:
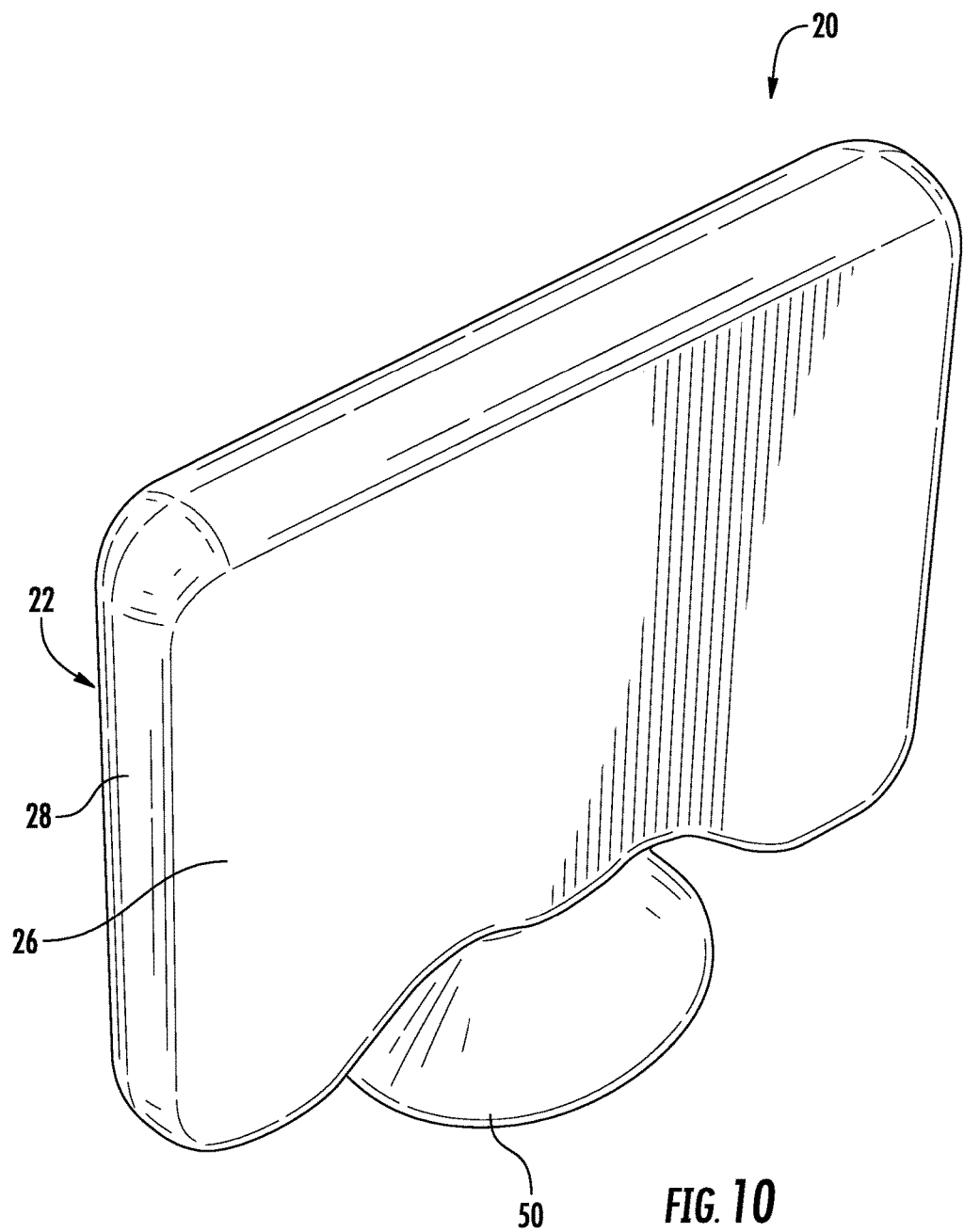
FIG. 10 is a bottom perspective view of the pet tag holder as shown in FIG. 9.
Figure 11:
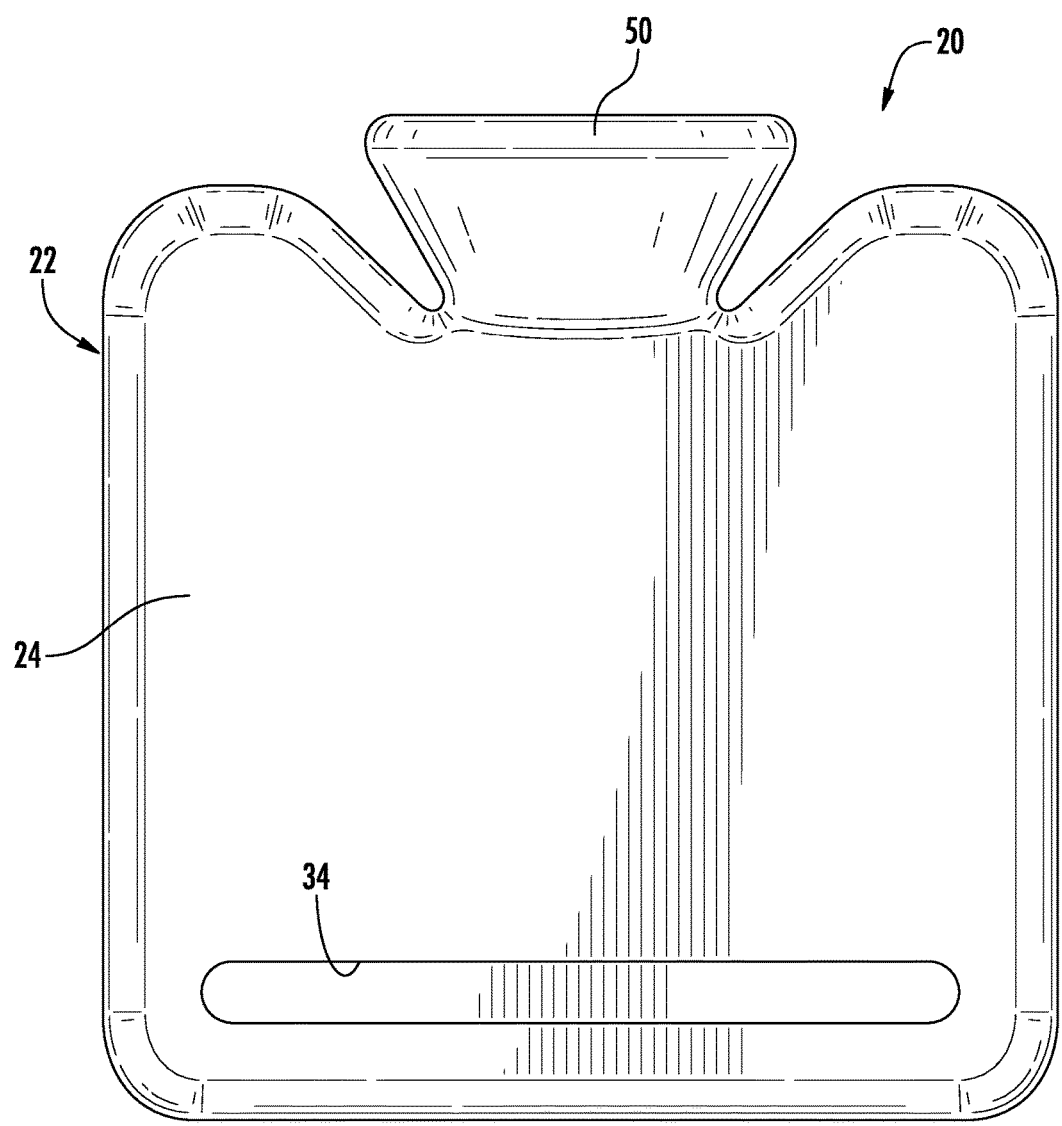
FIG. 11 is a front elevation view of the pet tag holder as shown in FIG. 9.
Figure 12:
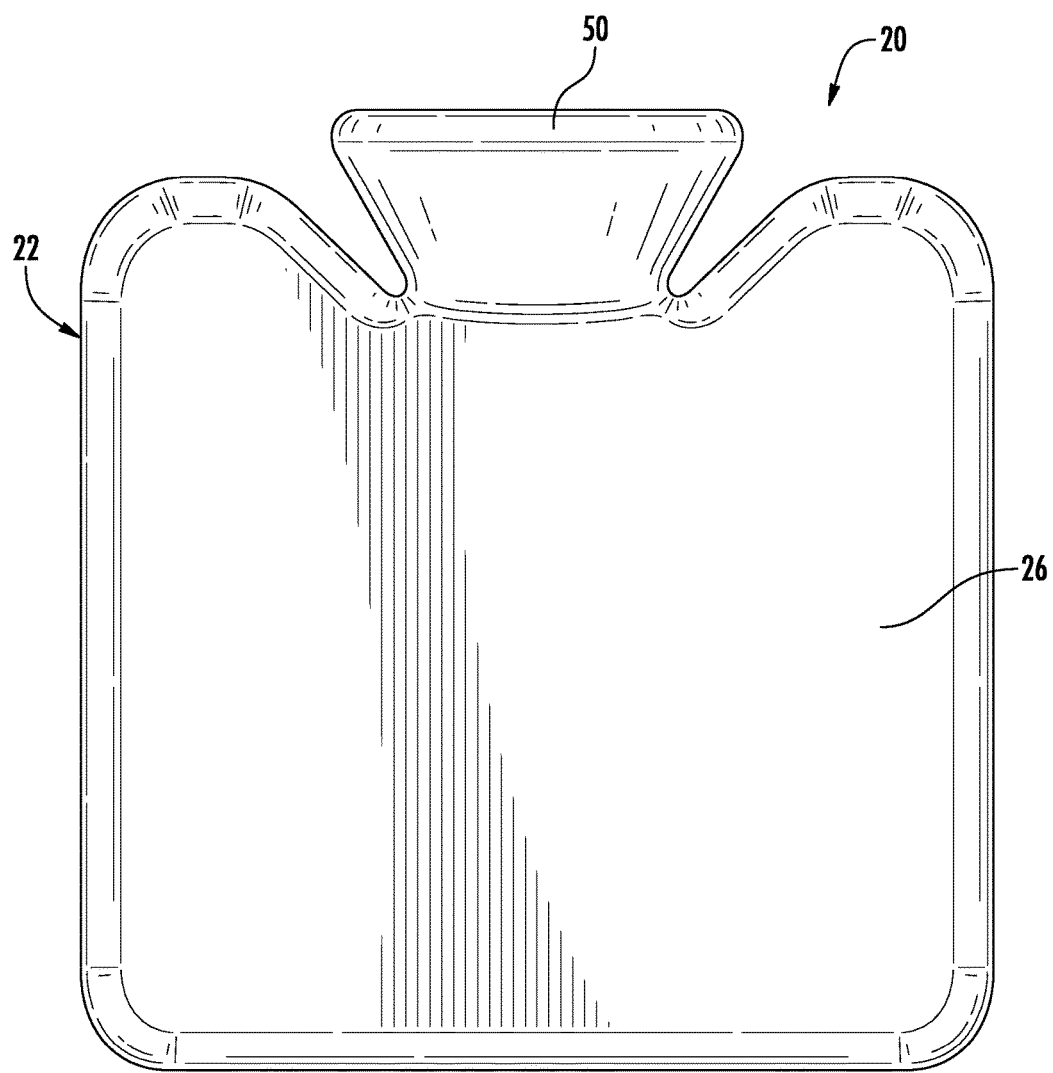
FIG. 12 is a rear elevation view of the pet tag holder as shown in FIG. 9.
Figure 13:
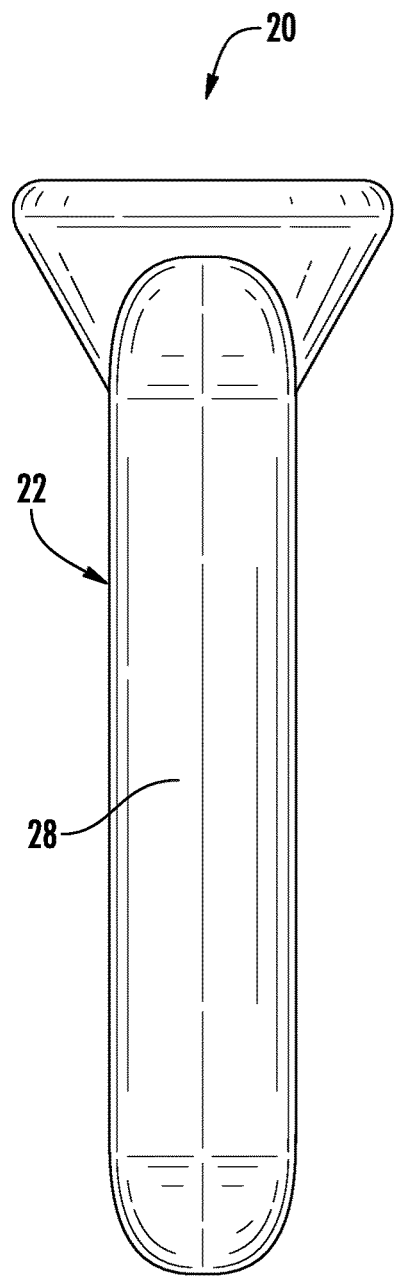
FIG. 13 is a right side elevation view of the pet tag holder as shown in FIG. 9.
Figure 14:
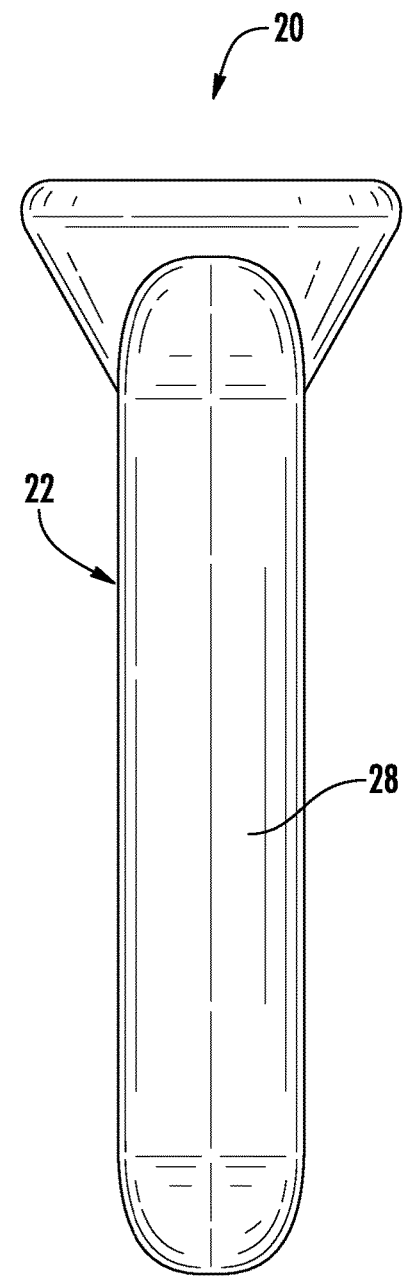
FIG. 14 is a left side view of the pet tag holder as shown in FIG. 9.
Figure 15:
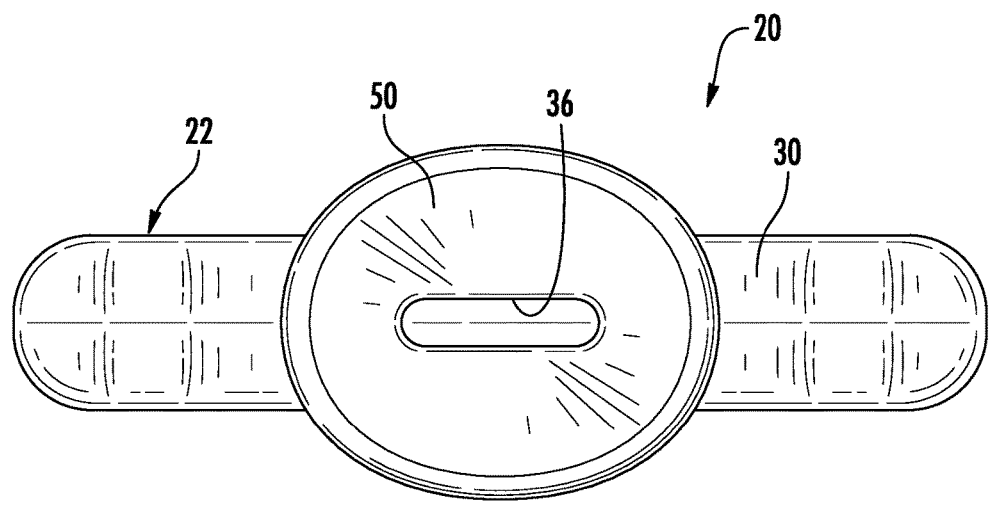
FIG. 15 is a top plan view of the pet tag holder as shown in FIG. 9.
Figure 16:
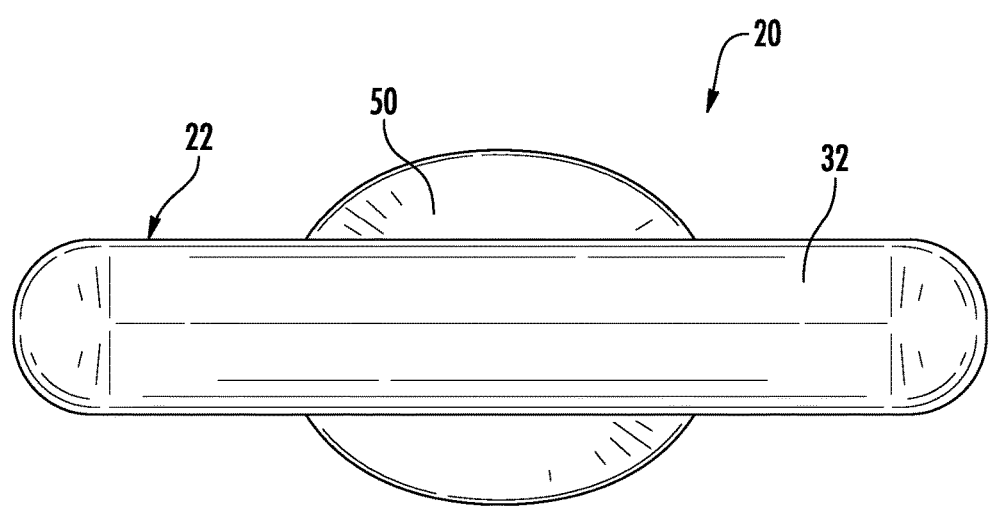
FIG. 16 is a bottom plan view of the pet tag holder as shown in FIG. 9.
Figure 17:
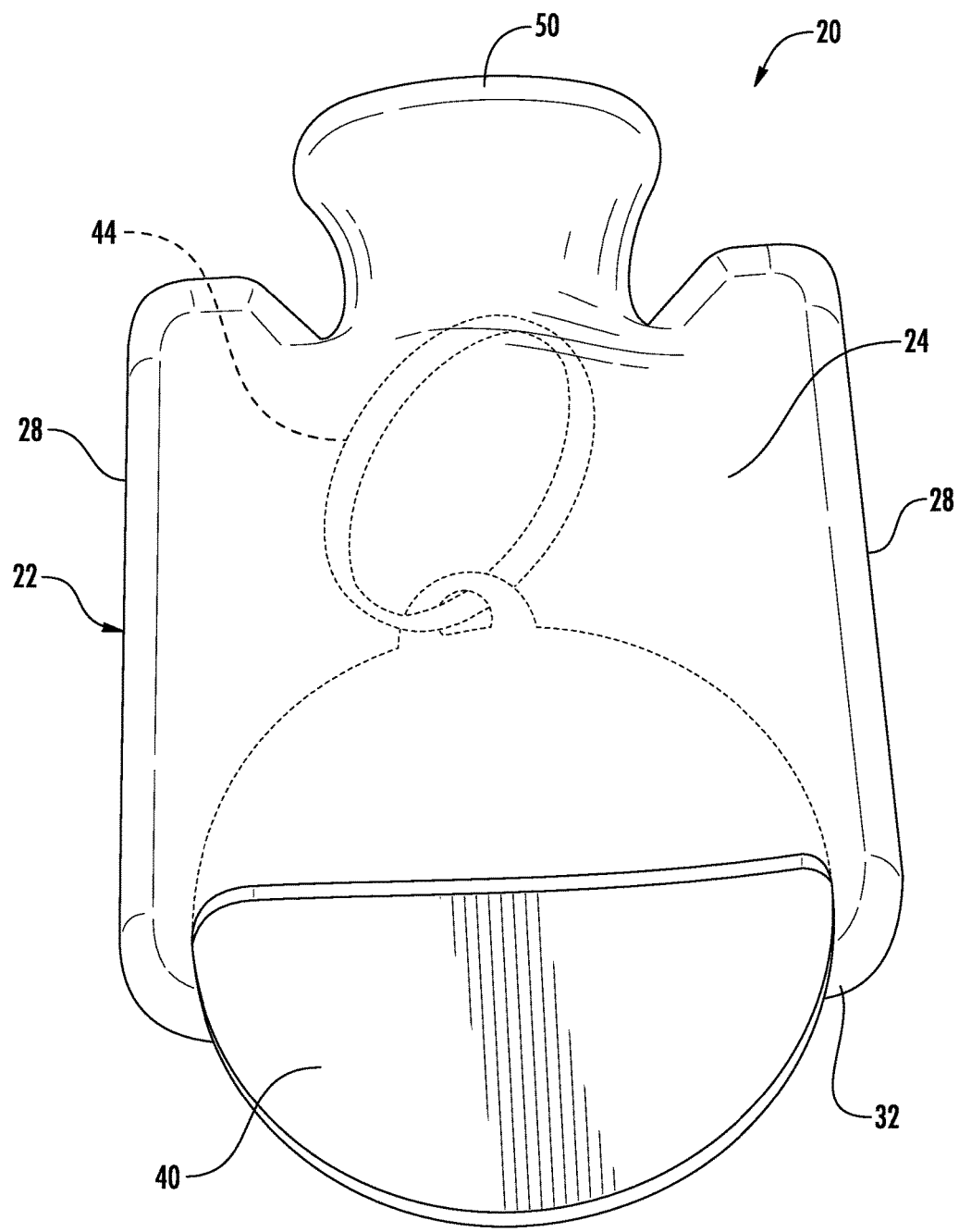
FIG. 17 is a photograph of a pet tag partially inserted into a pet tag holder.

In use, to insert a pet tag 40 into the pet tag holder 20, the side walls 28 are urged towards one another such as, for example, by squeezing the side walls 28 between the thumb and forefinger. Moving the side walls 28 towards one another urges the front wall 24 and the rear wall 26 away from one another enlarging and opening the slot 34 and thereby allowing insertion of the pet tag 40 into the cavity 33 defined by the sleeve through the slot 34. The tag 40 is inserted into the cavity 33 (FIG. 17) formed by the body 22 of the tag holder 20 until the tag fastener 44 extends through the fastener opening 36 in the top edge wall 30 (FIGS. 18 and 19). The pet tag fastener 44 is thus available to engage the pet collar 42. Once the side walls 28 are released the tag holder 20 moves towards its original shape, thereby securing the pet tag 40 in the sleeve. Because the tag holder 20 is made from a resilient, flexible material, the tag holder 20 allows insertion of pet tags 40 which are larger than the slot 34 or shaped differently than the body 22. The tag holder 20 deforms to some extent to allow the compression necessary to firmly secure the pet tag 40.

Figure 20:
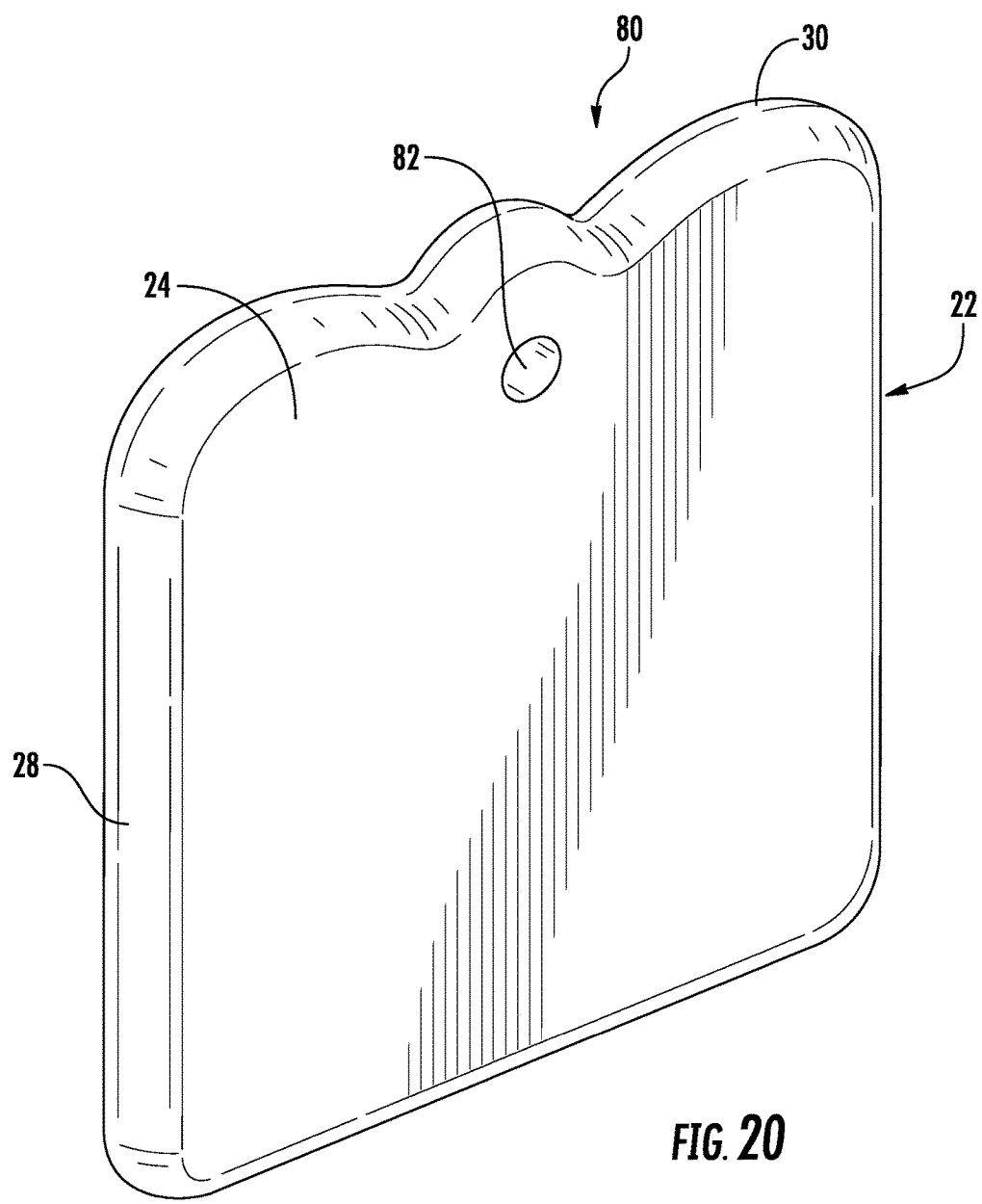
FIG. 20 is a top perspective view of a third embodiment of a pet tag holder.
Figure 21:
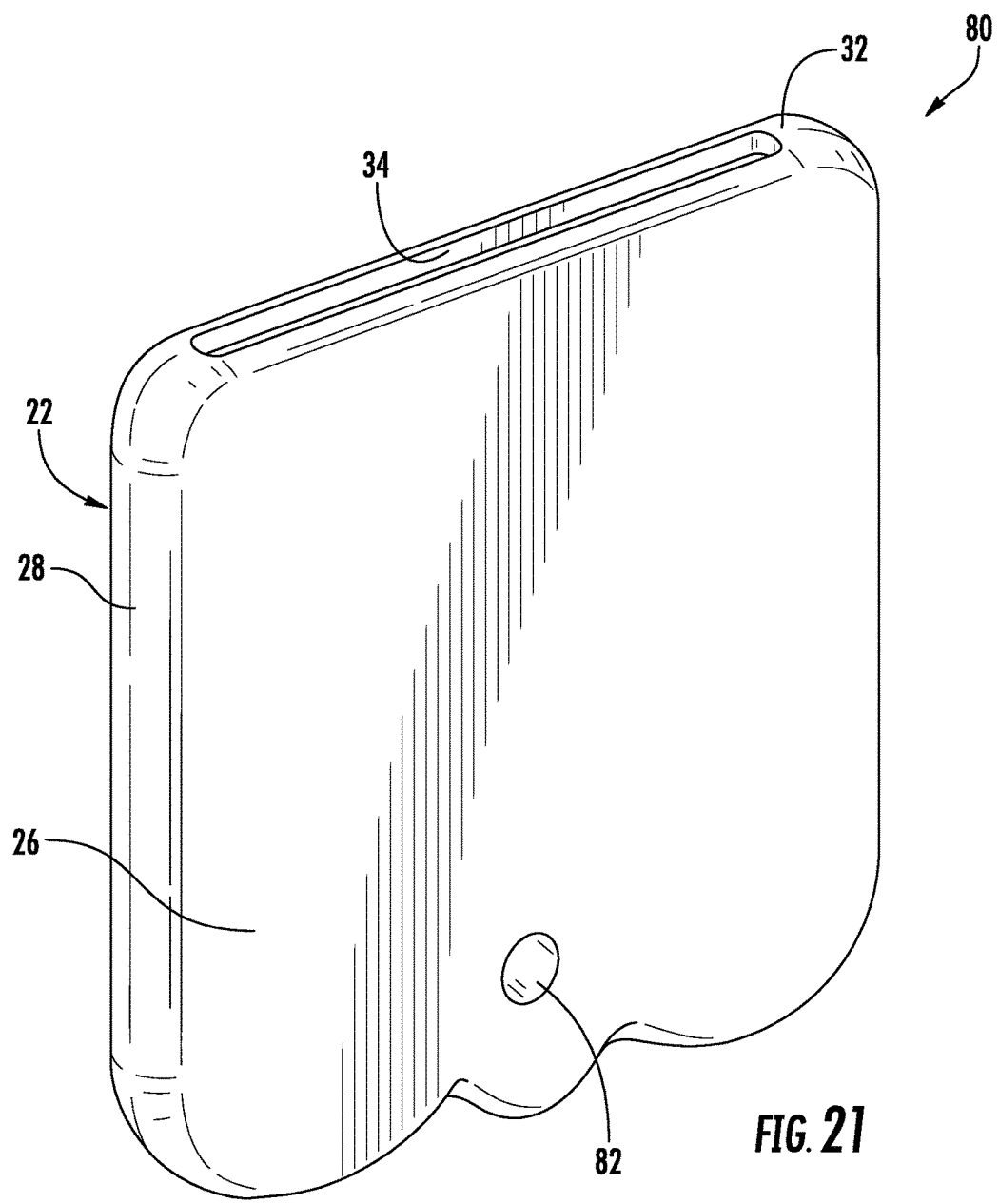
FIG. 21 is a bottom perspective view of the pet tag holder as shown in FIG. 20.
Figure 22:
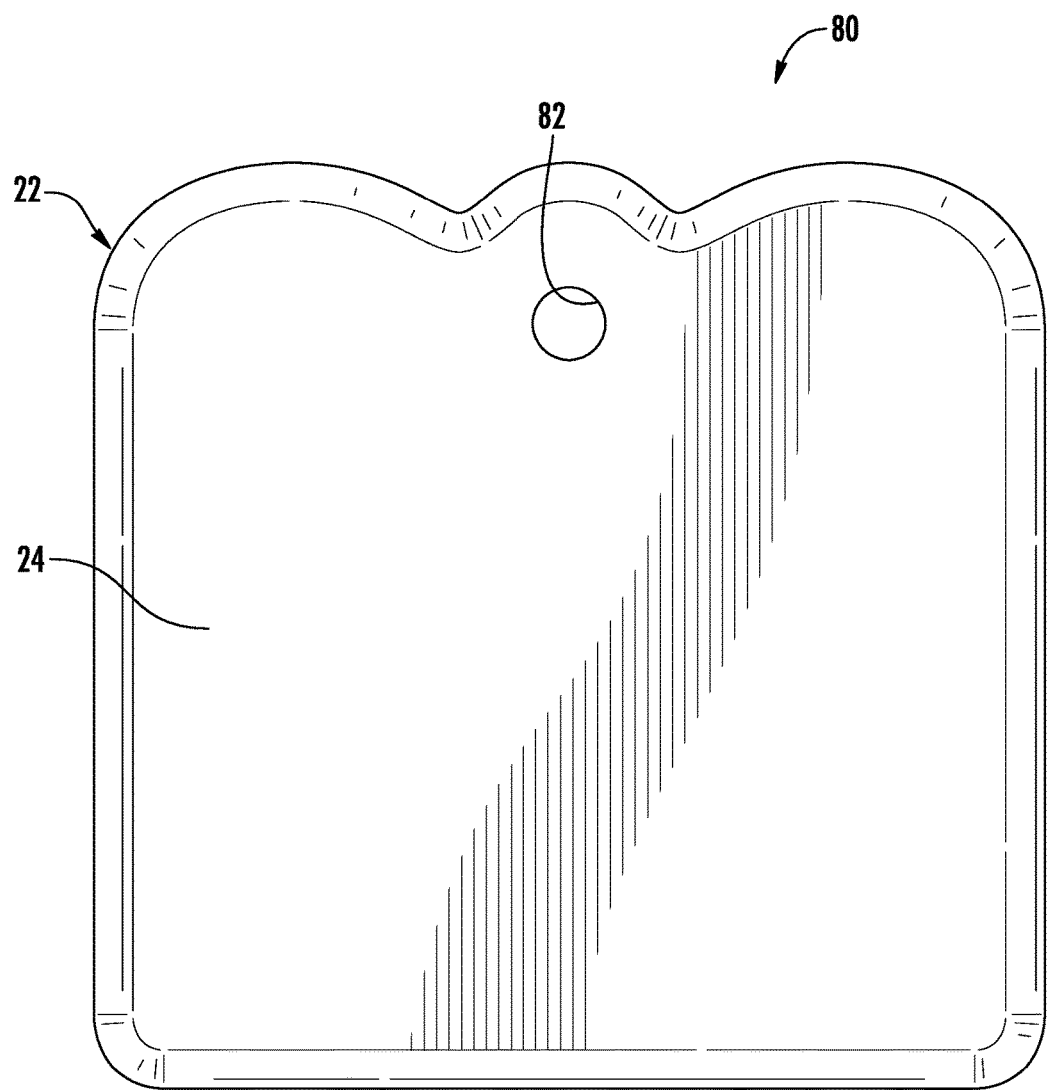
FIG. 22 is a front elevation view of the pet tag holder as shown in FIG. 20.
Figure 23:
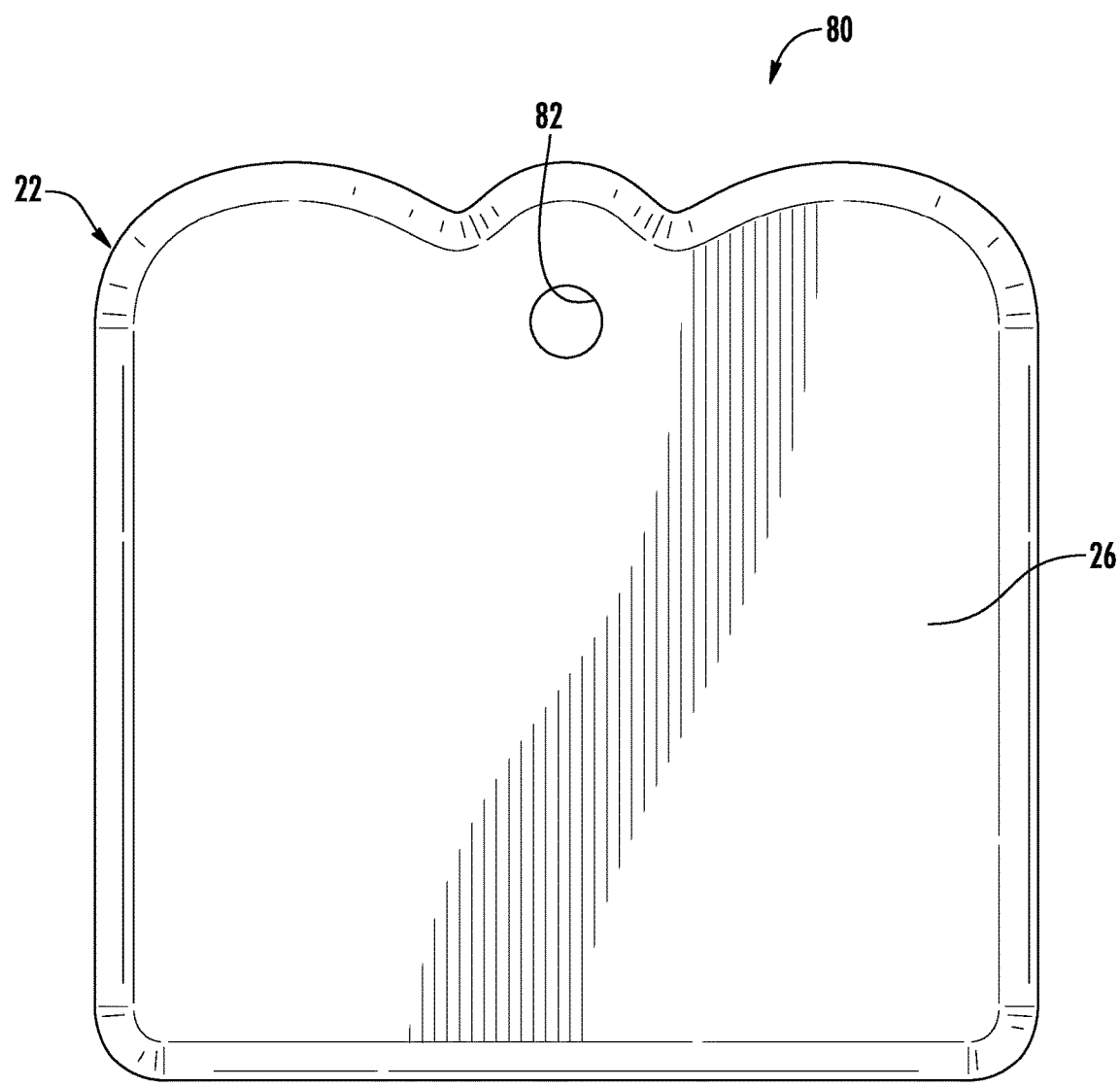
FIG. 23 is a rear elevation view of the pet tag holder as shown in FIG. 20.
Figure 24:
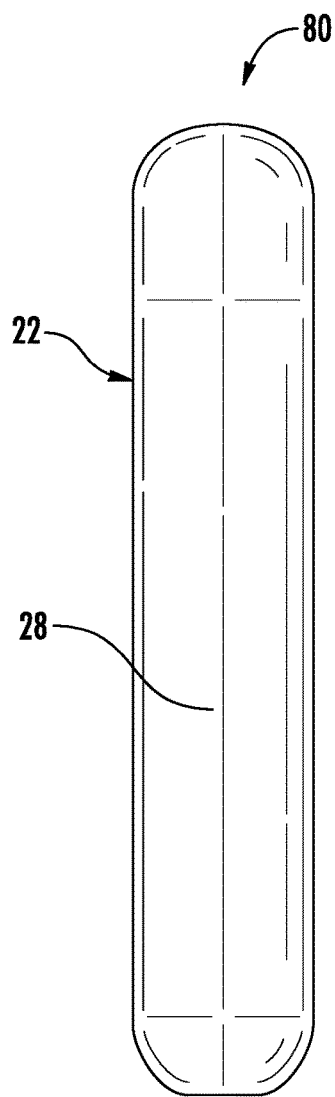
FIG. 24 is a right side elevation view of the pet tag holder as shown in FIG. 20.
Figure 25:
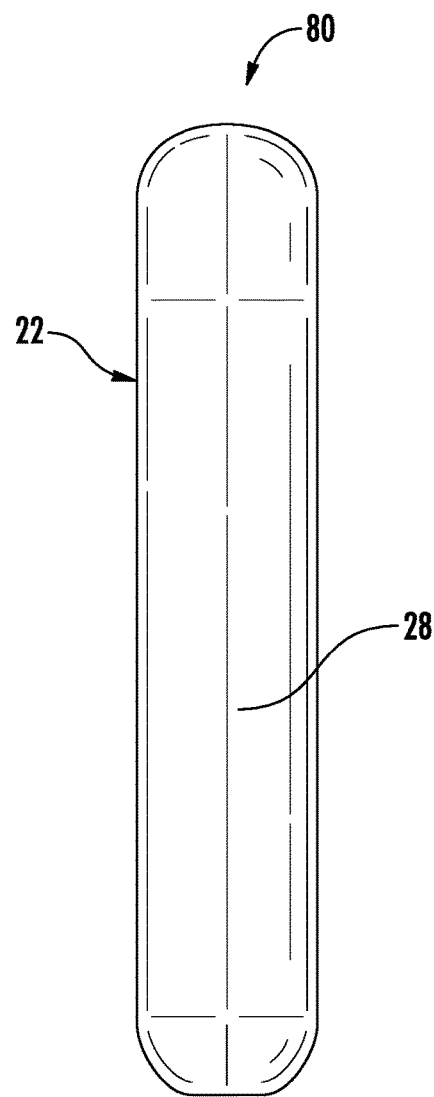
FIG. 25 is a left side view of the pet tag holder as shown in FIG. 20.
Figure 26:
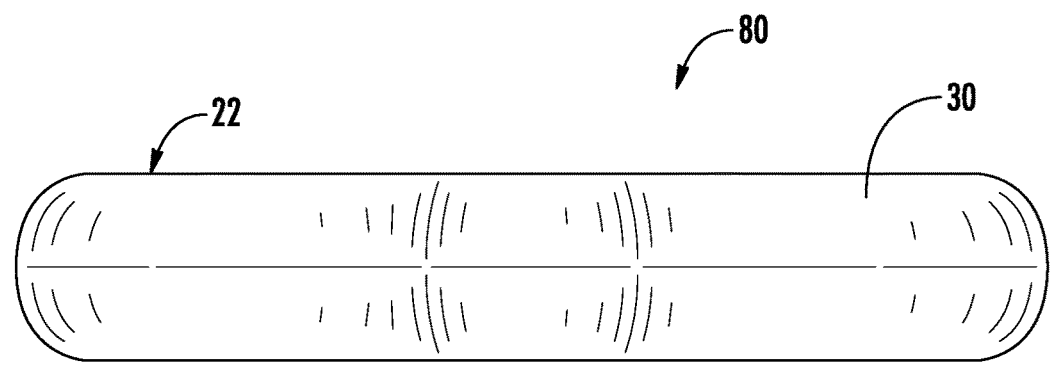
FIG. 26 is a top plan view of the pet tag holder as shown in FIG. 20.
Figure 27:
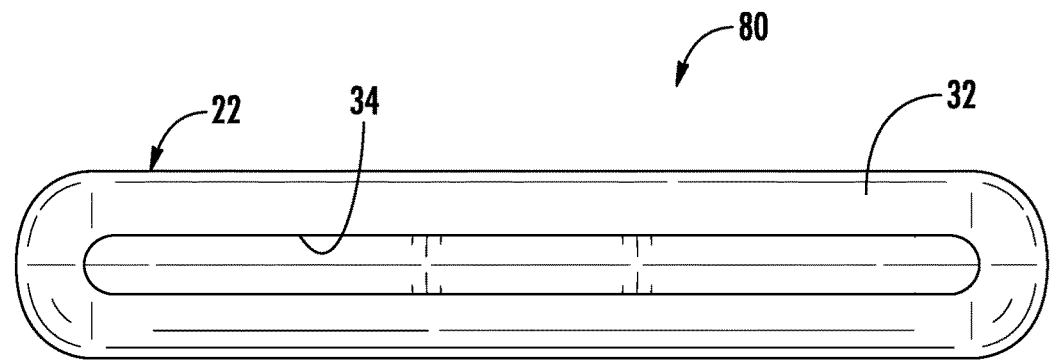
FIG. 27 is a bottom plan view of the pet tag holder as shown in FIG. 20.
Figure 28:
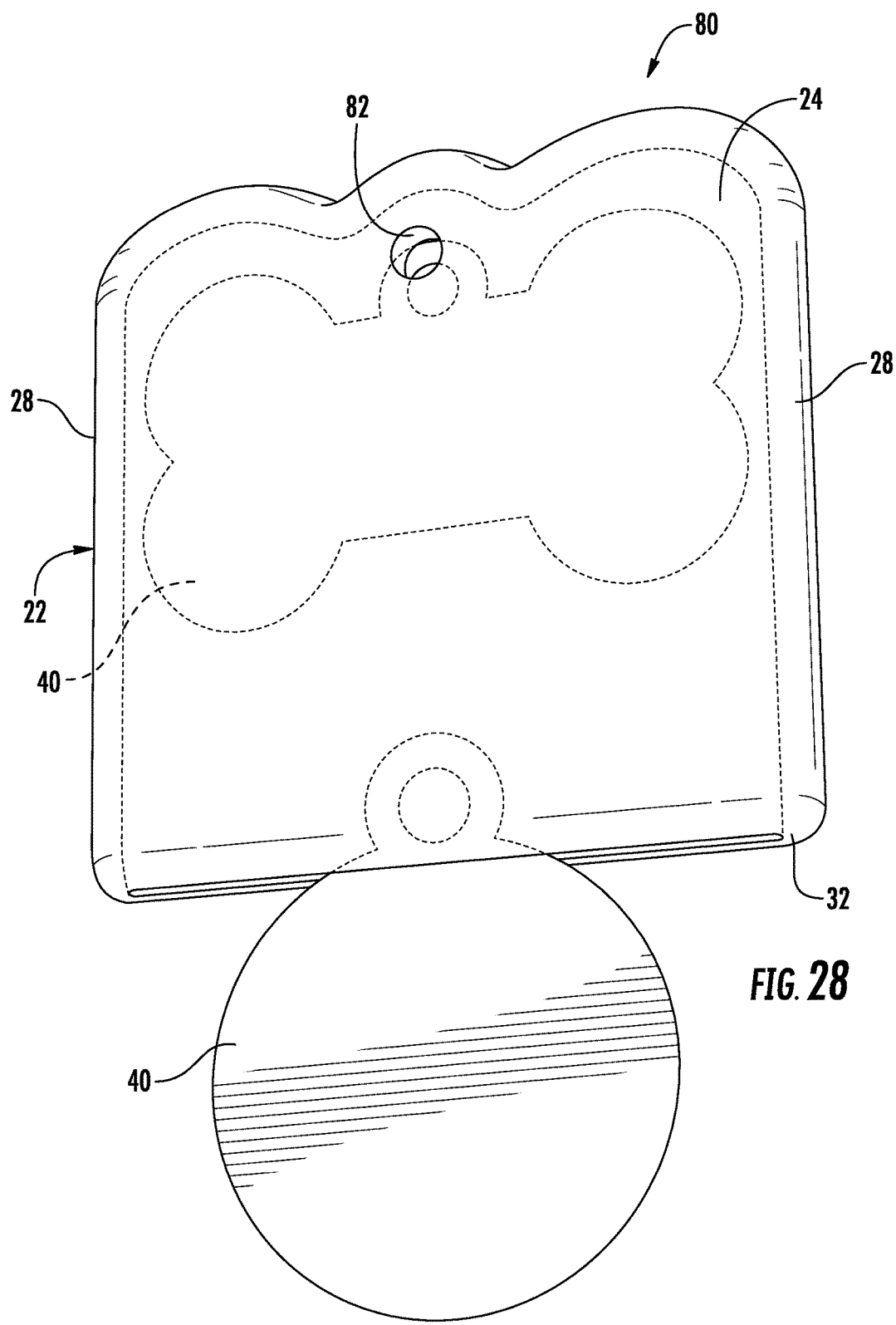
FIG. 28 is a perspective view of a pet tag holder as shown in FIG. 20 having a partially inserted pet tag.
Figure 29:
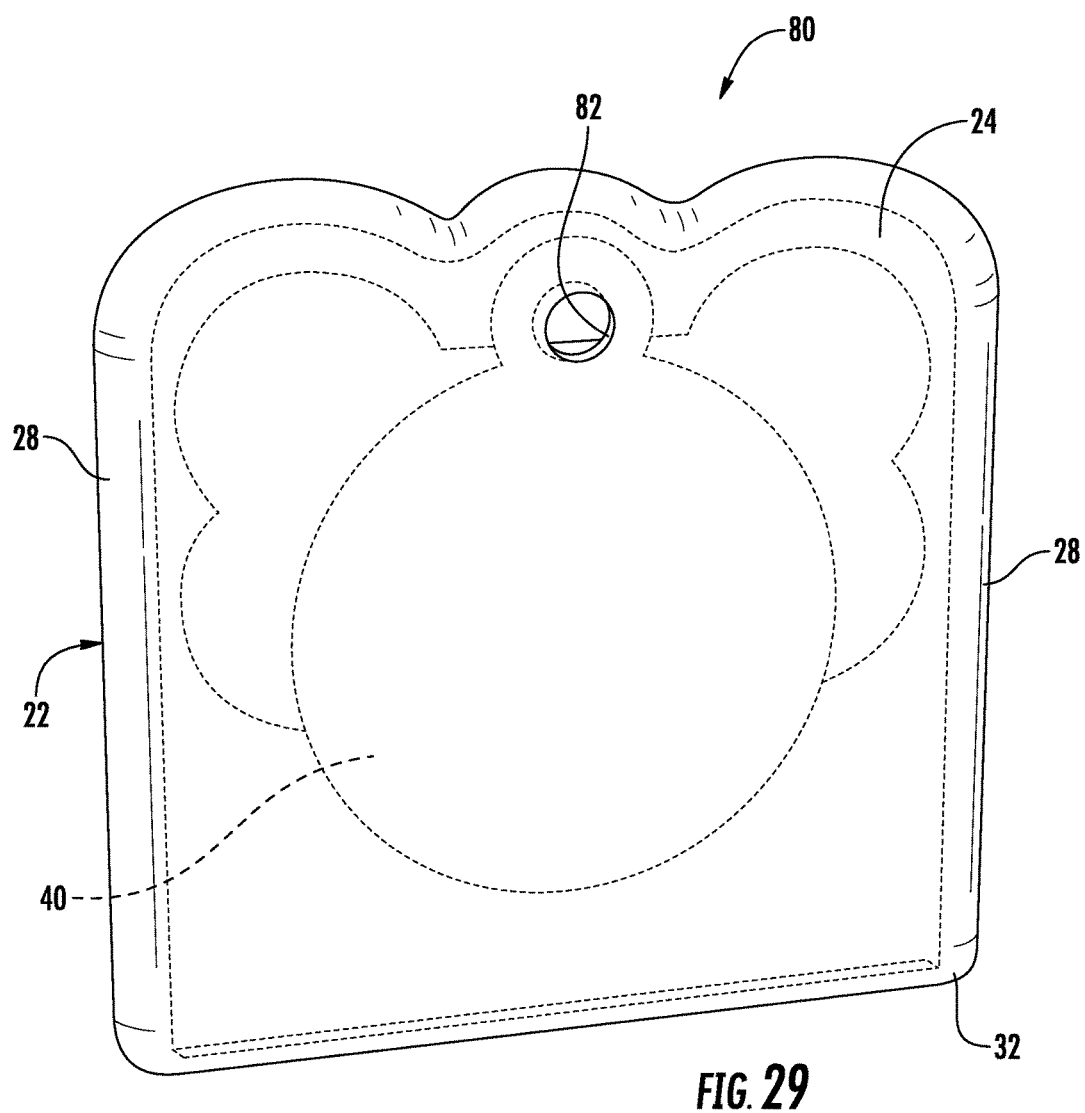
FIG. 29 is a perspective view of the pet tag fully inserted into the pet tag holder shown in FIG. 28.

In another embodiment shown in FIGS. 20 and 27, a pet tag holder generally designated at 80 comprises a flexible body 22 including a major front wall 24 and an opposed major rear wall 26. The front and rear walls 24, 26 are interconnected by side edge walls 28, a top edge wall 30 and a bottom edge wall 32 continuous with the side edge walls 28. The body 22 of the tag holder 20 defines a hollow sleeve having an interior cavity 33 for receiving and enclosing one or more pet tags 40. A slot 34 is provided in the body 22 of the tag holder 20 for inserting the tag 40 into the sleeve. In this embodiment, there is no opening is provided along the top edge wall 30. Rather, an opening 82 is provided through the major front and rear walls 24, 26. One or more pet tags 40 are inserted into the sleeve (FIGS. 28 and 29) through the slot 34. The openings in the pet tags 40 are aligned with the opening 82 in the pet tag holder 80 for attachment to a tag fastener 44 for securing to a collar 42.

The user then typically attaches the pet tag 40 and the tag holder 20 to a pet collar 42 by attaching the tag fastener 44 to a metal ring 43 or other connecting device integrated in the collar 42. Typically, most standard pet collars 42 include some sort of non-openable attachment member such as a D-ring, although the use of pet collars equipped with other styles of attachment members is also contemplated.

Although the preceding description describes the protection of a single pet tag 40, it is understood that the pet tag holder 20 also contemplates the insertion and protection of multiple pet tags in a single pet tag holder 20.

The pet tag holder 20 is adjustable or versatile enough to satisfactorily hold multiple commercial sizes, shapes, thicknesses and numbers of pet tags completely quietly. The pet tag holder 20 can be worn by cats or dogs comfortably on the various collar sizes. The tag holder 20 allows for easy access to the pet tag 40, easy removal of collected dirt, water, etc. Moreover, the translucent material of the pet tag holder 20 allows for easy access to the pet tags 40 for a person to view the information contained on each pet tag.

Although the pet tag holder has been shown and described in considerable detail with respect to only a few exemplary embodiments thereof, it should be understood by those skilled in the art that we do not intend to limit the pet tag holder to the embodiments since various modifications, omissions and additions may be made to the disclosed embodiments without materially departing from the novel teachings and advantages of the pet tag holder, particularly in light of the foregoing teachings. Accordingly, we intend to cover all such modifications, omissions, additions and equivalents as may be included within the spirit and scope of the pet tag holder as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A pet tag holder for supporting from a pet collar and a fastener connected to the tag, the pet tag holder comprising:
    a flexible, resilient body including
        a major front wall,
        an opposed major rear wall,
        side edge walls interconnecting the front and rear walls,
        a top edge wall, and
        a bottom edge wall, the top and bottom edge walls continuous with the side edge
        walls and interconnecting the front and rear walls,
    wherein the body defines a hollow sleeve having an interior cavity adapted for receiving and enclosing at least one pet tag and fastener and a slot for inserting the tag and fastener into the sleeve; and
    a protrusion extending from the top edge wall, the protrusion defining an opening into the interior cavity of the body for receiving the fastener of the pet tag and allowing access and connection to the fastener;
    wherein the body adapted for connecting the pet tag holder or the pet tag to the collar.

2. The pet tag holder as recited in claim 1, wherein the material of the body is translucent.

3. The pet tag holder as recited in claim 1, wherein the slot is defined along the bottom edge of the body.

4. The pet tag holder as recited in claim 1, wherein the slot is defined in the either the front wall or the rear wall adjacent the bottom edge.

5. In combination:
    a pet collar having an attaching member;
    a pet tag holder comprising
        a flexible, resilient body including
            a major front wall,
            an opposed major rear wall,
            side edge walls interconnecting the front and rear walls,
            a top edge wall,
            and a bottom edge wall, the top and bottom edge walls continuous with the
            side edge walls and interconnecting the front and rear walls
        wherein the body defines a hollow sleeve having an interior cavity adapted for receiving and enclosing at least one pet tag and a pet tag fastener connected to the tag and a slot for inserting the tag and fastener into the sleeve; and
        a protrusion extending from the top edge wall, the protrusion defining an opening into the interior cavity of the body for receiving the fastener of the pet tag and allowing access and connection to the fastener.

6. The combination as recited in claim 5, wherein the material of the body is translucent.

7. The combination as recited in claim 5, wherein the slot is defined along the bottom edge of the body.

8. The combination as recited in claim 5, wherein the slot is defined in the either the front wall or the rear wall adjacent the bottom edge.

9. The combination of claim 5, wherein said pet tag holder is adapted to receive pet tags larger than the slot.

\* \* \* \* \*